(12) United States Patent
Lavrenko

(10) Patent No.: US 8,770,935 B2
(45) Date of Patent: Jul. 8, 2014

(54) PROPELLER ARRANGEMENT

(75) Inventor: Alexander V. Lavrenko, Derby (GB)

(73) Assignee: Rolls-Royce PLC, London (GB)

(*) Notice: Subject to any disclaimer, the term of this patent is extended or adjusted under 35 U.S.C. 154(b) by 551 days.

(21) Appl. No.: 13/027,653

(22) Filed: Feb. 15, 2011

(65) Prior Publication Data

US 2011/0223020 A1 Sep. 15, 2011

(30) Foreign Application Priority Data

Mar. 9, 2010 (GB) .................................. 1003858.6

(51) Int. Cl.
F01D 1/24 (2006.01)

(52) U.S. Cl.
USPC .............. 416/87; 416/126; 416/130

(58) Field of Classification Search
USPC ................ 416/1, 271, 87, 126, 130
See application file for complete search history.

(56) References Cited

U.S. PATENT DOCUMENTS

| | | | | |
|---|---|---|---|---|
| 2,979,288 A | * | 4/1961 | Klein | 244/55 |
| 3,814,351 A | * | 6/1974 | Bielawa | 244/17.19 |
| 4,978,286 A | * | 12/1990 | Hurley | 416/89 |
| 5,743,489 A | * | 4/1998 | Stemme | 244/62 |
| 7,004,427 B2 | * | 2/2006 | Gerbino | 244/17.25 |
| 2005/0207890 A1 | * | 9/2005 | Shibata et al. | 416/132 B |
| 2010/0047068 A1 | | 2/2010 | Parry et al. | |
| 2010/0150717 A1 | * | 6/2010 | Turmanidze et al. | 416/87 |

FOREIGN PATENT DOCUMENTS

| | | |
|---|---|---|
| DE | 44 20 219 A1 | 12/1995 |
| EP | 2 009 246 A2 | 12/2008 |
| FR | 878 743 A | 1/1943 |
| WO | WO 2005/017351 A1 | 2/2005 |
| WO | WO 2008/142498 | 11/2008 |
| WO | WO 2008/142498 A1 | 11/2008 |

OTHER PUBLICATIONS

Search Report issued in British Application No. GB 1003858.6 dated Jun. 1, 2010.

Feb. 6, 2014 European Search Report issued in European Application No. 11 15 4441.

* cited by examiner

*Primary Examiner* — Nathaniel Wiehe
*Assistant Examiner* — Brian O Peters
(74) *Attorney, Agent, or Firm* — Oliff PLC

(57) ABSTRACT

A propeller arrangement has a first propeller assembly providing a row of first propellers, and a second propeller assembly, rearward of the first propeller assembly, providing a row of second propellers. The first and second propellers are radially extendable and retractable. The propeller arrangement further has a control system for controlling the extension and retraction of the first and second propellers. The control system is arranged such that when the propellers of one of the first and second propeller assemblies extend, the propellers of the other of the first and second assemblies retract.

16 Claims, 1 Drawing Sheet

PROPELLER ARRANGEMENT

FIELD OF THE INVENTION

The present invention relates to a propeller arrangement, particularly a variable diameter propeller arrangement.

BACKGROUND OF THE INVENTION

A purpose of a propeller is to convert the rotary motion of an engine into propulsive force, or thrust.

Increasingly, the design of modern propeller arrangements is influenced by environmental considerations. Such considerations include a need for increased fuel efficiency and reduced noise generation.

It is known that the efficiency of a traditional single-propeller assembly is increased by the provision of a second propeller assembly rotating in an opposite direction downstream of the first propeller. However, such arrangements, known in the art as contra-rotating propellers, generally suffer from increased noise generation compared to single propeller assembly arrangements.

It is understood that the increased noise generation is partly due to stream tube contraction and interaction between the second propeller blades and the vortices formed at the tips of the first propeller blades. The tip vortices' position is in line with the stream tube, and follows its contraction from the plane of first row of propellers to the plane of the second row of propellers. However, the amount of stream tube contraction varies, depending on the flight condition, the contraction tending to be greater in higher thrust conditions such as take off.

If the diameter of the second propeller assembly is larger than the diameter of the stream tube then noise generation will increase as the second row of propellers chop through the vortices. On the other hand, if the second propeller assembly diameter is reduced too far, with the aim of having the second propellers' tips radially inward from the vortices at all flight conditions, the contra-rotating system can loose propulsive efficiency.

US 2010/0047068 proposes a contra-rotating propeller engine in which the diameter of the rear propellers is less than the diameter of the front propellers.

WO05/017351 and WO08/8142498 propose telescopic rotor blades in which the rotor blades are split into sections that can move radially relative to each other to vary the overall lengths of the blades. EP A 2009246 proposes a propeller blade pitch control mechanism in which turning of the blade results in a slight outward movement of the blade.

SUMMARY OF THE INVENTION

An object of the present invention is to provide a propeller arrangement providing improved fuel efficiency and having reduced noise generation. In particular, an object is to facilitate an arrangement in which a second propeller assembly can have a smaller diameter than a first propeller assembly, the second propeller assembly being rearward of the first propeller assembly.

In general terms, the present invention provides a propeller arrangement having a first propeller assembly providing a row of first propellers, and a second propeller assembly, rearward of the first propeller assembly, providing a row of second propellers, at least one, and preferably both, of the first and second propellers being radially extendable and retractable. Generally, (i) the first propeller assembly and the second propeller assembly are coaxially aligned, (ii) the first and second propeller assemblies are contra-rotating, and/or (iii) the second propeller assembly has a smaller diameter than the first propeller assembly.

A first aspect of the present invention provides a propeller arrangement having:

a first propeller assembly providing a row of first propellers, and a second propeller assembly, rearward of the first propeller assembly, providing a row of second propellers, the first and second propellers being radially extendable and retractable, and a control system for controlling the extension and retraction of the first and second propellers;

wherein the control system is arranged such that when the propellers of one of the first and second propeller assemblies extend, the propellers of the other of the first and second assemblies retract.

Different diameters between the propeller assemblies can be described in terms of "radial offset", i.e. the difference in radial position between the tips of the first and second propellers. When, as is typical, the first propeller assembly has a larger diameter than the second propeller assembly, the difference in the radial distance between the tips of the first propeller blades and the tips of the second propeller blades can be termed the "crop".

Advantageously, the diameters of the first and second propeller assemblies may be varied in relation to each other. In this way, the noise generation and the efficiency of the propeller assembly may be varied, for example, according to the requirements of the different stages of aircraft flight.

A typical aircraft flight has a number of stages including: start-up, take-off, climb, cruise, descent, and landing. The operating conditions have different thrust requirements, which are closely correlated to stream tube contraction. Larger thrusts generally produce greater stream tube contractions, meaning that larger radial offsets between the tips of the front and rear rotor will be required.

The propeller arrangement facilitates a contra-rotating arrangement in which both propeller assembly diameters are able to vary dependent on stream tube contraction. The first propeller effectively increases the stream tube diameter when it increases its own tip radial position and the rear propeller decreases its own tip radial position. The relative motion of the two propellers can ensure that the tips of the second propellers do not interact with the vortices formed at the tips of the first propellers, i.e. by having the tips of the second propellers inward of the vortices at the plane of the second propeller assembly. However, because the crop is variable, loss in propulsive efficiency can be minimised or reduced across different flight stages, without substantially increasing noise production.

A further advantage of the present invention is that a desired crop can be achieved by relatively small, and opposing, radial movements of both assemblies, rather than a relatively large radial movement of only one assembly.

For example, in order to achieve a crop of 100 mm between the propeller assemblies, the first propellers may extend by 50 mm and the second propellers may retract by 50 mm. The reduced radial displacement of the propellers permits the use of control systems having components with reduced actuation distances. Such components can then be easier to accommodate in e.g. the limited space of a hub of a propeller arrangement.

The propeller arrangement may have any one or, to the extent that they are compatible, any combination of the following optional features.

Preferably, the first propeller assembly and the second propeller assembly are coaxially aligned. The first and second propeller assemblies are typically contra-rotating. The second propeller assembly typically has a smaller diameter than the first propeller assembly.

The control system may be further arranged such that the maximum extension of the first propellers and the maximum retraction of the second propellers provides a crop which is at least 5%, and preferably at least 10%, of the radius of the extended first propellers. The control system may be further arranged such that the maximum retraction of the first propellers and the maximum extension of the second propellers provides a crop which is at most 2%, and preferably at most 1%, of the radius of the retracted first propellers.

Preferably, the control system is hydraulically powered.

For example, the control system may comprise a plurality of first hydraulic chambers operatively connected to respective roots of the first propellers and a plurality of second hydraulic chambers operatively connected to respective roots of the second propellers, the hydraulic chambers being arranged such that varying the hydraulic pressure therein applies a radial force on the respective propellers, and the control system allowing hydraulic pressure to be transmitted between the first and second chambers, whereby, when the propellers of one of the first and second propeller assemblies extend, the pressure of hydraulic fluid in the corresponding hydraulic chambers varies and is transmitted to the hydraulic chambers of the other of the first and second propeller assemblies, causing the propellers of the other of the first and second assemblies to retract.

Advantageously, as the hydraulic chambers are operatively connected to the roots of the propellers, telescopic arrangements for varying propeller length, in which the propellers are split into sections, can be avoided. Thus, unlike the rotor blades of WO05/017351 and WO08/8142498, the propellers can be unitary components, which improves their mechanical integrity.

Preferably, the hydraulic chambers are arranged such that increasing the hydraulic pressure in the hydraulic chambers applies a radially inward force on the respective propellers.

Each hydraulic chamber can be provided by a respective hydraulic cylinder and piston arrangement. Conveniently, the roots of the propellers may form the pistons of the cylinder and piston arrangements.

Preferably, the control system provides a first operating mode in which the first propellers extend under centrifugal force, whereby the pressure of hydraulic fluid in the first chambers varies and is transmitted to hydraulic fluid in the second chambers, causing the second propellers to retract against centrifugal force acting thereon. The tips of the first propellers can thus be extended radially further outwards of the tips of the second propellers, i.e. to increase the radial offset between the first and the second propeller assemblies. This can reduce noise generation through a reduced interaction of the tips of the second propellers with vortices formed at the tips of the first propellers. The first operating mode is generally for flight conditions with higher thrust requirements, such as take-off and climb. In these conditions, the stream tube contraction tends to be greater, and a larger radial offset between the tips of the first and second propellers is desirable.

Advantageously, the transmission of hydraulic pressure enables the centrifugal force acting on the first propellers to power retraction of the second propellers. This can reduce the quantity and complexity of components in the control system. It also allows the propellers to respond automatically when the first operating mode is implemented.

The control system may further comprise a hydraulic pressure power source which is operatively connected to the roots of the second propellers, the control system providing a second operating mode in which the hydraulic pressure power source operates on the second propellers to cause them to extend, whereby the pressure of hydraulic fluid in the second chambers varies and is transmitted to hydraulic fluid in the first chambers, causing the first propellers to retract against centrifugal force acting thereon. The, tips of the second propellers can thus be extended radially towards the tips of the first propellers, i.e. to reduce the radial offset between the first and the second propeller assemblies. The second operating mode is generally for flight conditions with lower thrust requirements, such as start up, cruise and descent. In these conditions, the stream tube contraction tends to be less, so that the tips of the second propellers are preferably only slightly radially inwards of the tips of the first propellers and propulsive efficiency is improved.

Together, the first and second operating modes can be used to achieve reduce noise levels and increase fuel efficiency.

Preferably, the control system provides a third operating mode in which the first hydraulic chambers are isolated from the second hydraulic chambers preventing hydraulic pressure being transmitted therebetween. This operating mode can be used to fix the radial positions of the propellers.

As an alternative to hydraulic power, the control system may be electrically powered, e.g. with electrically powered actuators at the roots of the propellers for radially moving the propellers, and a control unit which sends electrical control signals to the actuators.

A second aspect of the present invention provides a turboprop engine having a propeller arrangement of the first aspect.

A third aspect of the present invention provides a method of operating an engine comprising a propeller arrangement having a first propeller assembly providing a row of first propellers, and a second propeller assembly providing a row of (typically contra-rotating) second propellers, the second propeller assembly being coaxial with and rearward of the first assembly, the method comprising the step of:

at a take-off or climb stage of a flight cycle, extending the first propellers and/or retracting the second propellers such that the tips of the first propellers are moved radially further outward of the tips of the second propellers.

The method may have any one or, to the extent that they are compatible, any combination of the following optional features.

The method may further comprise the step of:

at a cruise or descent stage of the flight cycle, retracting the first propellers and/or extending the second propellers such that the radial distances between the tips of the first propellers and the tips of the second propellers is reduced.

Preferably the engine, which is typically a turboprop engine, comprises a propeller arrangement according to the first aspect. In this way, when the propellers of one of the first and second propeller assemblies extend, the propellers of the other of the first and second assemblies retract. However, other propeller arrangements are possible, e.g. ones in which only the first propellers are extendable and retractable or only the second propellers are extendable and retractable.

BRIEF DESCRIPTION OF THE DRAWINGS

Embodiments of the invention will now be described by way of example with reference to the accompanying drawings in which.

DETAILED DESCRIPTION

Figure 1:
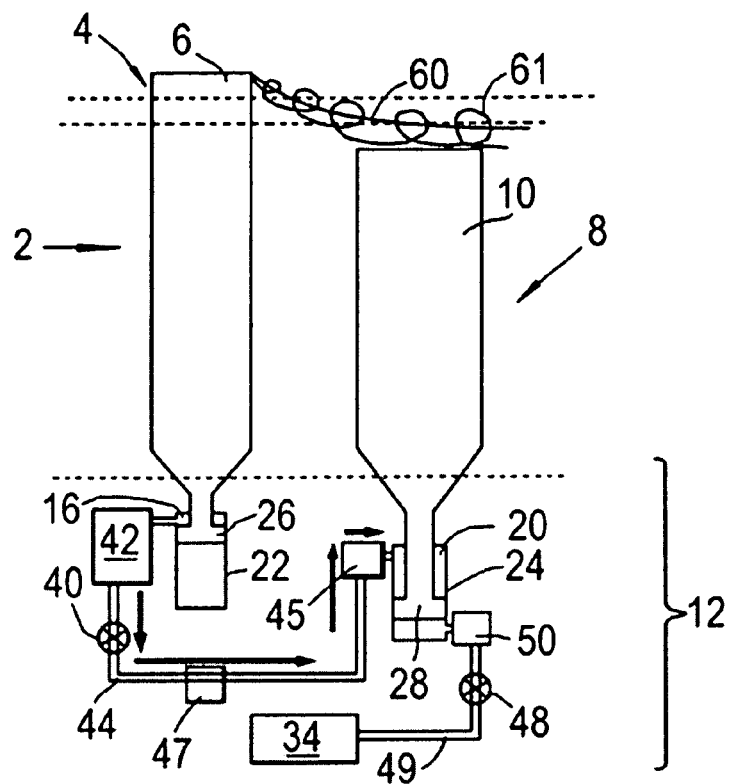
FIG. 1 shows a schematic longitudinal cross-section of a propeller arrangement in a first operating mode.

FIG. 1 shows a schematic longitudinal cross-section through a propeller arrangement 2 having a first propeller assembly 4 providing a row of first propellers 6 and a second propeller assembly 8 providing a row of contra-rotating second propellers 10, the propellers of both assemblies being extendable and retractable in a radial direction. The degree of extension or retraction of the propellers is controlled by a control system 12 which comprises first 22 and second 24 hydraulic cylinders and first 26 and second 28 pistons which are movable in the respective cylinders. The pistons are conveniently formed by the respective roots of the first and the second propellers. Each first cylinder and first piston pair forms a first hydraulic chamber 16, and each second cylinder and second piston pair forms a second hydraulic chamber 20, the fluid in the chambers being pressurised by radially outward movement of the pistons.

The control system 12 allows the first 16 and second 20 chambers to fluidly communicate with each other. More specifically, the first chambers 16 are connected to, or are integral with, a first manifold 42. A first fluid line 44 then extends from the first manifold to a second manifold 45 which connects to, or is integral with, the second chambers 20. A rotating hydraulic coupling 47 on the fluid line allows the first fluid line to cross the interface between that part of the propeller arrangement which rotates with the first propeller assembly 4, and that part which contra-rotates with the second propeller assembly 8. A first valve 40 on the first fluid line allows the first and second chambers to be isolated from each other, if necessary.

The control system also has a pump 34 which serves as a hydraulic pressure power source. A second fluid line 49 extends from the pump to a third manifold 50 which connects to, or is integral with, the second hydraulic cylinders 24 on the opposite sides of the pistons 28 to the second chambers 20. A second valve 48 on the second fluid line allows the second cylinders to be isolated from the pump, if necessary.

On rotation of the propeller assemblies, the first 6 and second 10 propellers experience a centrifugal force which acts in a radially outwards direction. This force urges the pistons 26, 28 radially outwardly, and generates hydraulic pressure in the chambers 16, 20. However, the pressure generated in the first chambers 16 is greater than the pressure generated in the second chambers 20. A number of factors may contribute to the pressure differential. A first factor can be that the first propellers experience a greater centrifugal force than the second propellers, for example due to relatively greater mass or radial extent of the first propellers. A further factor can be that the first cylinders 22 have a smaller cross-sectional area than the second cylinders 24.

In a first operating mode of the propeller arrangement, the first valve 40 is open and the second valve 48 is closed. The differential pressure in the first chambers 16 is transmitted to the second chambers 20 via a flow of hydraulic fluid (indicated by arrows in FIG. 1) out of the first chambers, into the first manifold 42, along the first hydraulic line 44, into the second manifold 45, and into the second chambers 20. The pressure in the second chambers produces a counter-force which is greater than the centrifugal force acting on the second propellers 10. Thus the first propellers 6 extend and the second propellers retract. Following this relative movement, the tips of the extended first propellers are radially further outwards of the tips of the retracted second propellers. This offset arrangement results in reduced noise generation and is particularly advantageous in the stages of take-off and climb. More particularly, in these stages, the contraction of the stream tube 60 rearward of the first assembly 4 is increased, and the tip vortices 61 which tend to follow the stream tube from the tips of the first propellers are relatively large. However, the increased crop allows the second propellers to avoid chopping through the vortices.

When a desired offset position of the first and second propellers is reached, the first valve can be closed to prevent further radial movement of the propellers. Alternatively, if the desired offset position is the maximum offset position allowed by movement of the pistons in the cylinders, then it can be unnecessary to close the first valve.

Figure 2:
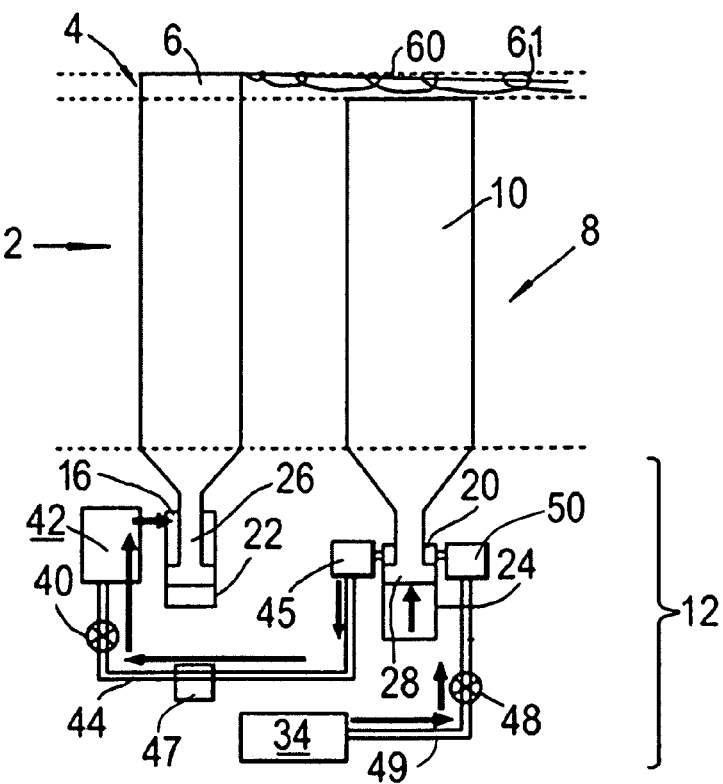
FIG. 2 shows a schematic longitudinal cross-section of the propeller arrangement in a second operating mode.

FIG. 2 shows a schematic longitudinal cross-section of the propeller arrangement in a second operating mode. The first valve 40 and the second valve 48 are open and hydraulic fluid pressurised by the pump 34 is transmitted, via the second fluid line 49 and manifold 50, into the second hydraulic cylinders 24, where it acts on the second pistons 20, causing the second propellers 10 to extend. This extension reduces the volume of the second chambers 20, increasing the pressure of hydraulic fluid therein to a level which is greater than the pressure generated in the first chambers 16. The differential pressure in the second chambers is transmitted to the first chambers via a flow of hydraulic fluid (indicated by arrows in FIG. 2) which reverses the flow of the first operating mode. The pressure in the first chambers now produces a counter-force which is greater than the centrifugal force acting on the first propellers 6, causing the first propellers to retract and the second propellers to extend. As a result, the tips of the extended second propellers become radially closer to the tips of the retracted first propellers, than in the first operating mode, although still radially inwards of the tips of the first propellers. This position is most suitable for start-up and descent, and for the cruise stage.

Some flight conditions may require a crop between the maximum and minimum radial offsets shown in FIGS. 1 and 2. Thus when a desired crop is achieved, the first valve 40 and second valve 48 may be closed, to prevent further radial movement of the propellers.

Advantageously, the propeller arrangement allows different degrees of crop to be provided as needed on given flight stages. The control system can be contained within the hub of the propeller arrangement and does not require the propellers to be split into telescoping sections. Despite such constraints, the arrangement can provide significant amounts of relative radial movement of the first and second propellers.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

The invention claimed is:
1. A propeller arrangement having:
a first propeller assembly providing a row of first propellers, and a second propeller assembly, rearward of the first propeller assembly, providing a row of second propellers, the first and second propellers being unitary components and radially extendable and retractable, and a control system configured with a controller so as to control the extension and retraction of the first and second propellers;

the control system is arranged such that when the propellers of one of the first and second propeller assemblies extend, the propellers of the other of the first and second assemblies retract.

2. A propeller arrangement according to claim 1, wherein the first propeller assembly and the second propeller assembly are contra-rotating.

3. A propeller arrangement according to claim 1, wherein the control system is hydraulically powered.

4. A propeller arrangement according to claim 3, wherein the control system comprises
   a plurality of first hydraulic chambers operatively connected to respective roots of the first propellers and
   a plurality of second hydraulic chambers operatively connected to respective roots of the second propellers,
   the first and second hydraulic chambers being arranged such that varying the hydraulic pressure therein applies a radial force on the respective propellers, and the control system allowing hydraulic pressure to be transmitted between the first and second chambers, whereby, when the propellers of one of the first and second propeller assemblies extend, the pressure of hydraulic fluid in the corresponding hydraulic chambers varies and is transmitted to the hydraulic chambers of the other of the first and second propeller assemblies, causing the propellers of the other of the first and second assemblies to retract.

5. A propeller arrangement according to claim 4, wherein the hydraulic chambers are arranged such that increasing the hydraulic pressure in the hydraulic chambers applies a radially inward force on the respective propellers.

6. A propeller arrangement according to claim 4, wherein each hydraulic chamber is provided by a respective hydraulic cylinder and piston arrangement.

7. A propeller arrangement according to claim 6, wherein the roots of the propellers form the pistons of the cylinder and piston arrangements.

8. A propeller arrangement according to claims 4, wherein the control system provides a first operating mode in which the first propellers extend under centrifugal force, whereby the pressure of hydraulic fluid in the first chambers varies and is transmitted to hydraulic fluid in the second chambers, causing the second propellers to retract against centrifugal force acting thereon.

9. A propeller arrangement according to claim 8, wherein, under the first operating mode, the tips of the first propellers are extended radially further outwards of the tips of the second propellers.

10. A propeller arrangement according to claim 8, wherein the control system further comprises a hydraulic pressure power source which is operatively connected to the roots of the second propellers, the control system providing a second operating mode in which the hydraulic pressure power source operates on the second propellers to cause them to extend, whereby the pressure of hydraulic fluid in the second chambers varies and is transmitted to hydraulic fluid in the first chambers, causing the first propellers to retract against centrifugal force acting thereon.

11. A propeller arrangement according to claim 10, wherein, under the second operating mode, the tips of the second propellers are extended radially towards the tips of the first propellers.

12. A propeller arrangement according to claim 10, wherein the control system provides a third operating mode in which the first hydraulic chambers are isolated from the second hydraulic chambers, preventing hydraulic pressure being transmitted therebetween.

13. A propeller arrangement according to claim 1, wherein the control system is electrically powered.

14. A turboprop engine having the propeller arrangement according to claim 1.

15. A turboprop engine having a propeller arrangement having:
   a first propeller assembly providing a row of first propellers, and a second propeller assembly, rearward of the first propeller assembly, providing a row of second propellers, the first and second propellers being radially extendable and retractable, and
   a control system configured with a controller so as to control the extension and retraction of the first and second propellers;
   the control system is arranged such that when the propellers of one of the first and second propeller assemblies extend, the propellers of the other of the first and second assemblies retract.

16. A propeller arrangement having:
   a first propeller assembly providing a row of first propellers, and a second propeller assembly, rearward of the first propeller assembly, providing a row of second propellers, the first and second propellers being unitary components and radially extendable and retractable by actuation at their roots, and
   a control system configured with a controller so as to control the extension and retraction of the first and second propellers;
   the control system is arranged such that when the propellers of one of the first and second propeller assemblies extend, the propellers of the other of the first and second assemblies retract.

* * * * *